Patented Nov. 19, 1935

2,021,869

UNITED STATES PATENT OFFICE 2,021,869

PRODUCTION OF VINYL ETHERS

Walter Reppe and Werner Wolff, Ludwigshafen-on-the-Rhine, Germany, assignors to I. G. Farbenindustrie Aktiengesellschaft, Frankfort-on-the-Main, Germany No Drawing. Application January 4, 1935, Serial No. 365. In Germany January 10, 1934

1 Claim. (Cl. 260—151)

The present invention relates to the production of vinyl ethers.

In the U. S. Patent No. 1,959,927, one of the present inventors has described a process for the catalytic production of vinyl ethers from non-explosive mixtures of hydrocarbons of the acetylene series with alcohols according to which acetylene is caused to act at temperatures between about 80° and about 250° C. in a strongly alkaline medium on liquefied organic, monomeric hydroxy compounds. In the said process the action of the acetylene, in cases when the boiling point of the hydroxy compound employed is below the reaction temperature, is carried out under pressure, for example discontinuously in autoclaves or continuously in pressure-tight towers.

We have now found that even organic hydroxy compounds containing but one free alcoholic hydroxyl group which boil at a temperature below the reaction temperature can be used for working at atmospheric pressure in the liquid phase by so increasing the concentration of the base used as catalyst and dissolved in the reaction liquid that at the reaction temperature employed the solution still remains liquid. The reaction proceeds under the said conditions at practically the same speed as when working under pressure. Moreover it is unnecessary to dilute the acetylene with inert gases, as for example nitrogen, a procedure which is necessary when working under pressure, on the ground of safety. It is especially advantageous to carry out the reaction continuously in a reaction tower from which the vinyl ethers formed are continuously distilled off. The acetylene which has not been used up is returned in circulation to the reaction tower.

As organic hydroxy compounds containing but one free alcoholic hydroxyl group especially suitable for the purpose of the present invention may be mentioned aliphatic alcohols as for example ethyl alcohol, propyl alcohols, butyl alcohols, amyl alcohols and hexyl alcohols, and partially etherified polyhydric alcohols containing but one free alcoholic hydroxyl group as for example ethylene or propylene glycol monomethyl or ethyl ether or butylene glycol monomethyl ether.

As catalysts may be mentioned especially the oxides, hydroxides, alcoholates and phenolates of the alkali metals.

The following examples will further illustrate how this invention may be carried out in practice but the invention is not restricted to these examples. The parts are by weight.

Example 1

Into a tower containing a solution of 15 parts of caustic potash in 100 parts of normal butanol which is boiling at 126° C. there are introduced at the temperature of 126° C. acetylene at the bottom at such a rate that the gas is almost completely absorbed and butanol at such a rate that the level of the liquid in the tower is kept constant. The upper part of the tower is provided with a column so constructed that almost pure vinyl butyl ether distils over (at from 91° to 95° C.). A small amount of potassium butyrate forms as a by-product in the said reaction; this collects at the lower end of the tower and is withdrawn periodically. It is especially advantageous to charge the tower with filler bodies, such as rings, by which a fine dispersion of the acetylene is effected, and also to circulate the contents of the tower continually.

Example 2

A 9.9 per cent solution of caustic potash in ethylene glycol monoethyl ether is treated with acetylene in the apparatus described in Example 1. By employing a reaction temperature of from 150° to 160° C., almost pure ethylene glycol ethyl vinyl ether (boiling point 126° C.) distils over without appreciable amounts of by-products being formed.

What we claim is:

A process for producing vinyl ethers which comprises causing acetylene to act at atmospheric pressure in the liquid phase on organic hydroxy compounds containing but one free alcoholic hydroxyl group which boil at a temperature below the reaction temperature, in a strongly alkaline medium, the concentration of the base used as catalyst and dissolved in the reaction liquid being so high that at the reaction temperature employed the solution still remains liquid.

WALTER REPPE.
WERNER WOLFF.